United States Patent
Daily et al.

(10) Patent No.: US 9,557,225 B2
(45) Date of Patent: Jan. 31, 2017

(54) QUICK CONNECT TEMPERATURE SENSING ASSEMBLY FOR MEASURING TEMPERATURE OF A SURFACE OF A STRUCTURE

(71) Applicant: Daily Instruments, Houston, TX (US)

(72) Inventors: Jeffrey N. Daily, Houston, TX (US); Fahad Shamsi, Houston, TX (US); Larry D. Welch, Richmond, TX (US)

(73) Assignee: Daily Instruments, Houston, TX (US)

( * ) Notice: Subject to any disclaimer, the term of this patent is extended or adjusted under 35 U.S.C. 154(b) by 492 days.

(21) Appl. No.: 14/020,542

(22) Filed: Sep. 6, 2013

(65) Prior Publication Data

US 2014/0105248 A1    Apr. 17, 2014

Related U.S. Application Data

(60) Provisional application No. 61/698,302, filed on Sep. 7, 2012.

(51) Int. Cl.
| | | |
|---|---|---|
| *G01K 1/00* | (2006.01) | |
| *G01D 21/00* | (2006.01) | |
| *G01K 1/14* | (2006.01) | |

(52) U.S. Cl.
CPC .................. *G01K 1/14* (2013.01); *G01K 1/143* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,385,197 | A * | 5/1983 | Schwagerman | G01K 7/04 136/221 |
| 6,390,670 | B1 * | 5/2002 | Nimberger | C08L 79/08 374/142 |
| 6,390,676 | B1 * | 5/2002 | Colombo | B32B 27/08 383/109 |
| 2005/0221244 | A1 * | 10/2005 | Nguyen | F23N 5/107 431/80 |
| 2006/0219285 | A1 * | 10/2006 | Nguyen | F23N 5/107 136/230 |
| 2010/0037689 | A1 * | 2/2010 | Arzberger | B22D 2/00 73/295 |

* cited by examiner

*Primary Examiner* — Lisa Caputo
*Assistant Examiner* — Nasir U Ahmed
(74) *Attorney, Agent, or Firm* — Duane Morris LLP; Diana Sangalli; Patrick Muldoon

(57) ABSTRACT

A quick connect temperature sensing assembly for measuring the surface of a structure includes a thermocouple device, a docking device and a spring loaded adapter to connect the thermocouple device with the docking device. The docking device can be made of a magnetic material so that the assembly can be quickly connected and disconnected from the surface of a structure for sensing the temperature of the surface. When disconnected, the end of the thermocouple device extends beyond the bottom surface of the docking device. When the bottom surface of the docking device engages the surface of the structure, the end of the thermocouple is retracted and the spring loaded adapter maintains a biasing force on the thermocouple to maintain the end of the thermocouple in contact with the surface.

18 Claims, 3 Drawing Sheets

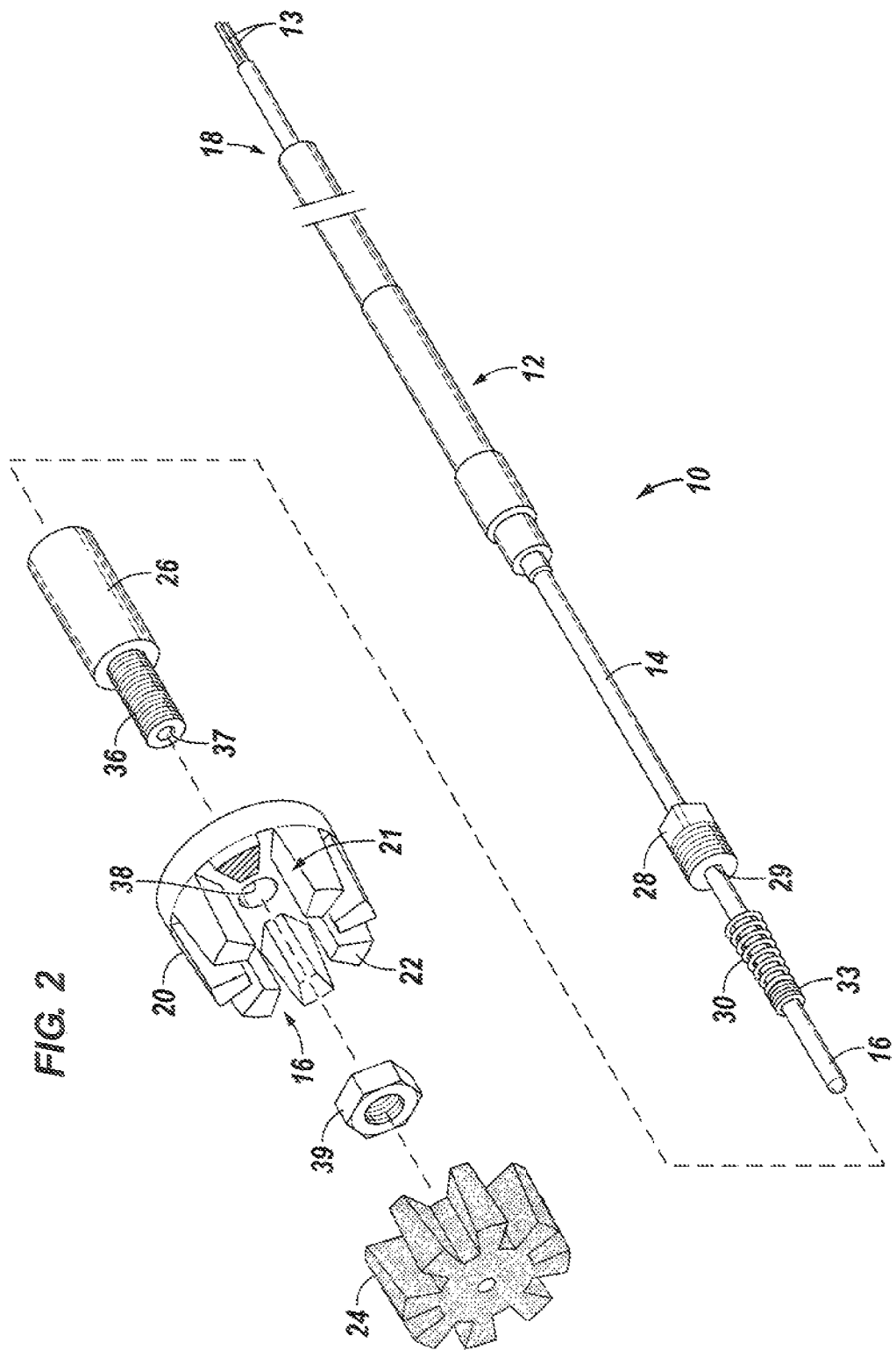

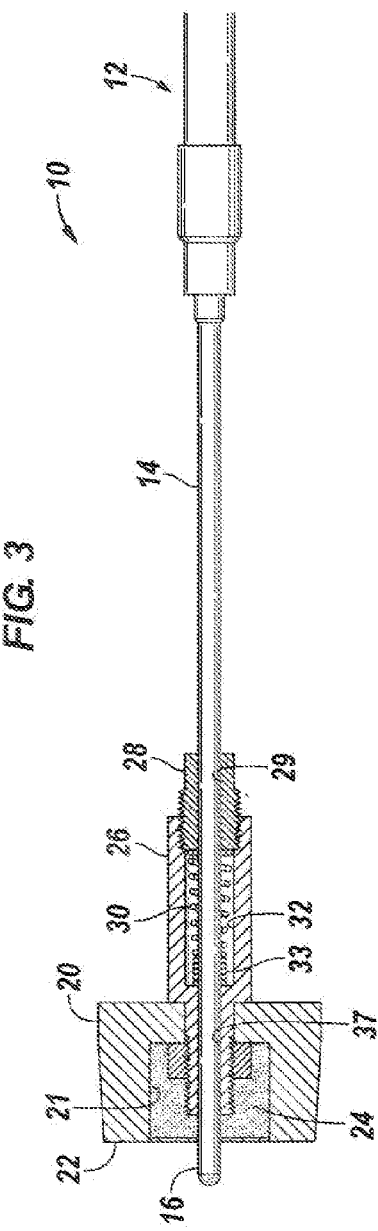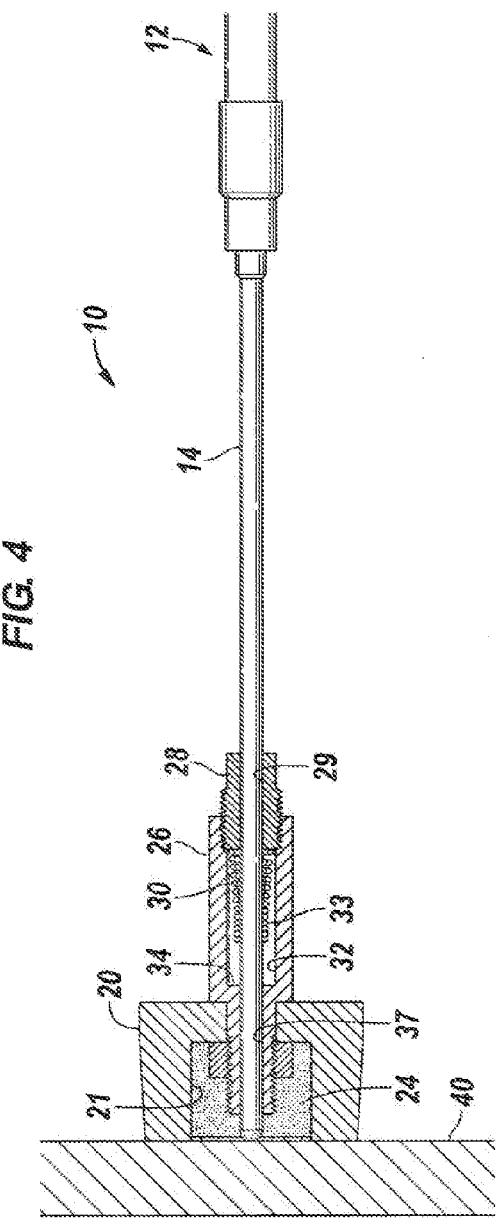

QUICK CONNECT TEMPERATURE SENSING ASSEMBLY FOR MEASURING TEMPERATURE OF A SURFACE OF A STRUCTURE

CROSS-REFERENCE TO RELATED APPLICATIONS

This application claims benefit of priority to U.S. Provisional Patent Application Ser. No. 61/698,302, entitled "Quick Connect Temperature Sensing Assembly for Measuring Temperature of a Surface of a Structure," filed Sep. 7, 2012, the entire contents of which are hereby incorporated by reference.

TECHNICAL FIELD

The present invention relates generally to sensing temperature, and, more particularly, to sensing temperature on the surface of a structure, such as a high temperature reactor vessel.

BACKGROUND

The petrochemical and refining industries generally employ various processes where temperature must be measured reliably and with a high degree of accuracy. Typically, the environments in which temperature is measured require subjecting the temperature sensing devices to extreme conditions, including temperatures in excess of 1300° F. These harsh conditions present challenges with respect to reliably providing accurate temperature measurements of a particular structure over extended periods of time. For instance, it is oftentimes desirable to acquire temperature measurements of various structures, such as the surface (or skin) of tubes or other conduits that are present within a furnace or the surface (or skin) of a high temperature vessel used in a refining process to ensure both that the structure is not overheating and that the process is occurring at a desired temperature. Typically, these temperature measurements are taken by fixedly attaching the temperature sensor to the outer surface of the structure, such as by welding. However, due to the extreme temperatures to which the sensor is exposed, the sensor's useful life may be limited and, as a result, the temperature sensing device often is replaced multiple times over the life of the vessel, which requires shutdown of the refining process. Consequently, if a failed instrumentation cannot be readily removed and a replacement readily installed, the processing downtime can be extremely costly.

In some circumstances, it may be desirable to acquire temperature measurements at locations on the surface of the structure where a temperature sensor previously has not been attached. As with replacement of failed sensors, the addition of new sensors again requires costly shutdown of the refining process.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 2 is an exploded view of the assembly of FIG. 1, according to an embodiment.

FIG. 3 is a partial cross-sectional side view of the assembly of FIG. 1, according to an embodiment.

FIG. 4. is a partial cross-sectional side view of the assembly of FIG. 1, illustrating the assembly in contact with the surface of a structure, according to an embodiment.

DETAILED DESCRIPTION

Figure 1:
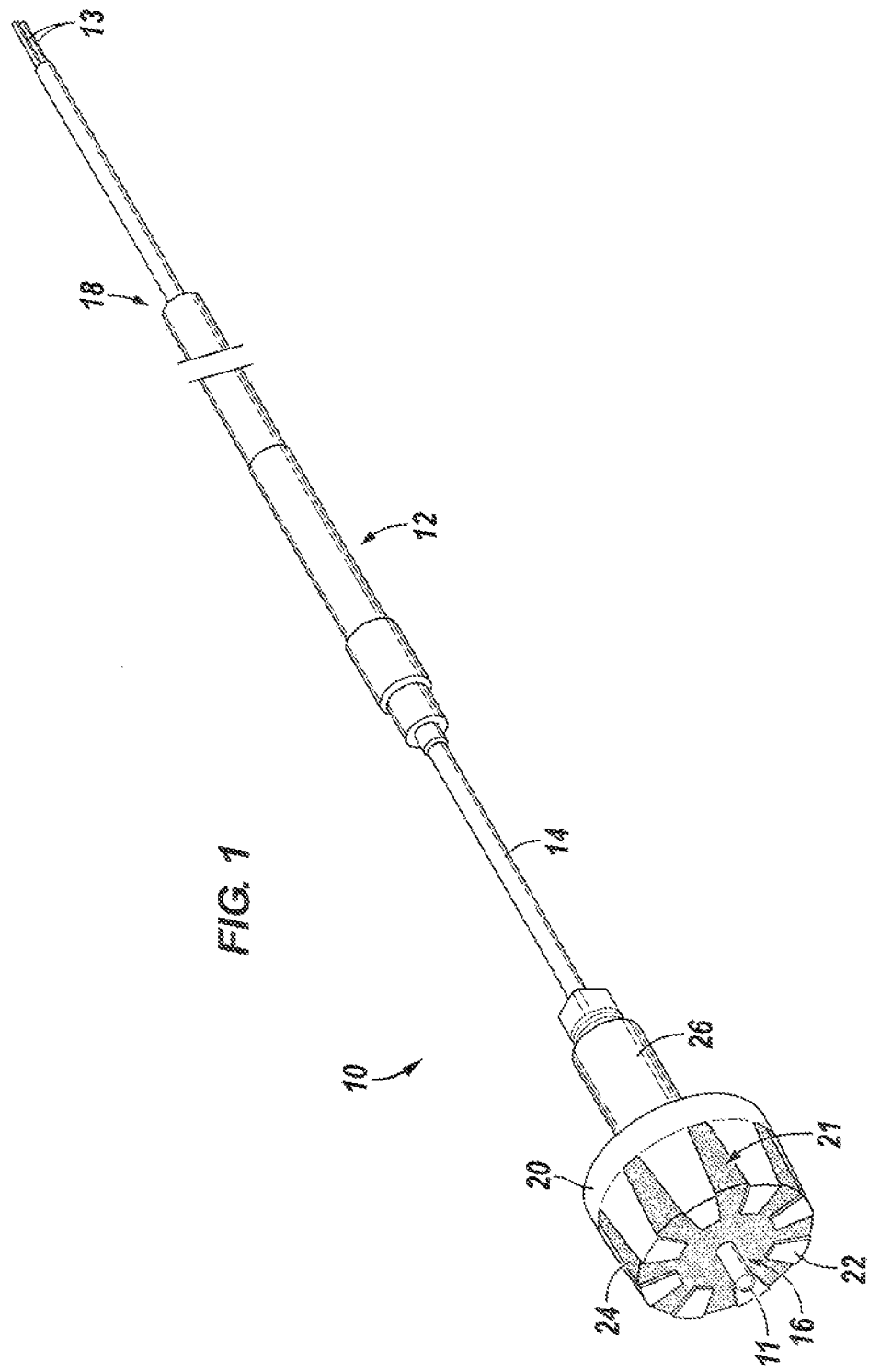
FIG. 1 is a perspective view of an exemplary quick connect temperature sensing assembly, according to an embodiment.

Referring generally to FIG. 1, a perspective view of a temperature sensing assembly 10 for sensing the temperature at a surface of a structure, such as a furnace tube or a high temperature vessel in which a hydrocarbon refining or reaction process occurs, is shown. The assembly 10 is arranged so that a temperature sensor can be readily installed at any desired location on the surface of the structure. Towards that end, the temperature sensing assembly 10 shown in FIG. 1 includes a thermocouple device 12 having at least one temperature sensing junction point 11 formed by a conductor pair 13 that is disposed within a longitudinal sheath 14. The sheath 14 has a distal end 16 and an opposed end 18 from which the conductor pair 13 extends. In some embodiments, the conductor pair 13 comprises a pair of conductors made of dissimilar materials, preferably metals, which are joined at the junction point 11 which is located at the distal end 16 of the sheath 14. The junction point 11 can be exposed at the outer surface of the sheath 14 or may be entirely contained within the sheath 14 at or proximate the distal end 16. As an example, the dissimilar materials may be welded together to form the junction point 11. The free ends of the conductor pair 13 are connected to instrumentation, e.g., a voltmeter, that measures the difference in potential created at the junction of the two metals. This difference in potential corresponds to a given temperature.

The temperature sensing assembly 10 further includes a mounting or docking device 20 that enables the assembly 10 to be quickly and removably connected to the surface of a structure. In an exemplary embodiment, the docking device 20 is made of a magnetic material, such as ALnico, so that the docking device 20 can be magnetically coupled to a desired location on the surface of the structure of interest. For instance, the docking device 20 can have a holding force in the range of 70-150 pounds, but other holding forces also are contemplated. In general, the magnetic material from which the docking device 20 is made retains its magnetization properties at high temperatures. For instance, the magnetic material may retain approximately 90% of its room temperature magnetization at temperatures up to 1000° F.

In other embodiments, the docking device 20 may be made of a nonmetallic material and may be configured so that the bottom surface 22 of the device 20 can be welded to the surface of the structure. For instance, the bottom surface 22 can be substantially flat for coupling to a flat surface of the structure. Or the bottom surface 22 can be concave for coupling to convex surface of the structure. In yet other embodiments, the docking device 20 may further be configured so that it can be attached to the surface of the structure with a fastener, such as a screw.

In the embodiment shown, the docking device 20 includes a recessed portion 21 that is filled with a thermally insulative material 24 (e.g., ZIRCAR™ SALI Moldable or ZIRCAR™ AX Moldable insulation), which serves to insulate the thermocouple device 12 from the ambient air and that can withstand the high temperatures present in the environment in which the assembly 10 is deployed. For instance, in some applications, the assembly 10 may be exposed to temperatures in excess of 1000° F. In this manner, the thermocouple device 12 can more accurately sense the temperature at the selected location on the surface of the vessel.

In the embodiment shown, the assembly 10 further includes an adapter 26 for receiving the sheath 14 of the thermocouple device 12. In some embodiments, the adapter 26 may be made of a magnetic material. In some embodiments, regardless of the material, the adapter 26 can be spring loaded. When not attached to the surface of a structure (as shown in FIG. 1), the spring (or other biasing device) of the adapter 26 is not compressed or loaded, and the distal end 16 of the sheath 14 of the device 12 protrudes past the bottom surface 22 of the docking device 20. When the docking device 20 is attached to a desired location on the surface of the vessel of that the surface 22 contacts the surface of the structure, the distal end 16 of the device 12 moves against the force of the spring or other biasing device. However, the spring is sufficiently biased so that the distal end 16 of the device 12 (which contains the junction point 11) remains in contact with the surface of the structure to which the docking device 20 is attached. In this manner, the spring loaded adapter 26 helps to maintain the junction point 11 in close proximity to the surface of interest so that accuracy of the temperature measurements made by the assembly 10 is enhanced. In some embodiments, the distal end 16 of the sheath 14 can have a substantially flat surface to improve the thermal coupling between the thermocouple device 12 and the surface of the structure on which temperature is monitored.

FIG. 2 is an exploded view of an exemplary embodiment of the assembly 10 of FIG. 1. The thermocouple device 12 includes a coupler portion 28 that is configured to couple the device 12 with the adapter 26. The coupler portion 28 has a passageway 29 therethrough through which the sheath 14 extends. The passageway 29 is sized so that the sheath 14 can freely move through the passageway 29. In the example, the coupler portion 28 includes a threaded portion for coupling with the adapter 26, as can best be seen in FIGS. 3 and 4. In other embodiments, any type of suitable coupling device can be used to couple the sheath 14 to the adapter 26 that still allows for movement of the sheath 14 in the direction of its longitudinal axis when couple with adapter 26.

The assembly 10 also includes a biasing member 30, e.g., a helical spring, a leaf spring or other biasing device, that is located proximate the distal end 16 of the sheath 14. In this example, the biasing member 30 is attached to the sheath 14, thus providing a stop that maintains the coupler portion 28 about the sheath 14.

As shown in FIGS. 3 and 4, the adapter 26 includes a receptacle region 32 that contains the biasing member 30 when the coupler 28 is received by and engages with the adapter 26. In the example shown in FIG. 3, an end 33 of the biasing member 30 abuts a surface 34 of the receptacle 32 when the assembly 10 is not attached to the surface of a structure. The other end of the biasing member 30 abuts the coupler 28. In some embodiments, the biasing member 30 may be attached to the coupler 28. In other embodiments, the biasing member 30 may not abut the surface 34 or, alternatively, may not abut the coupler 28 when the assembly 10 is not yet coupled to the surface of a structure.

In the embodiment shown in FIGS. 3 and 4, the biasing member 30 is coupled to the sheath 14 through an interference fit with some of the coils. The diameter of the coils of the member 30 proximate the end 33 are sized such that they fit snugly around the sheath 14 and thus grip the outer surface of the sheath 14. In other embodiments, the gripping end 33 of the biasing member 30 and the sheath 14 may be sized such that end 32 may have some movement along the length of the sheath 14 before end 32 grips sheath 14. In any event, the remaining coils of member 30 are sized so that the member 30 can be compressed when the assembly 10 is attached to the surface of a structure. In yet other embodiments, the biasing member 30 may not be coupled to the sheath 14, and some other stop device (e.g., a protrusion, a resilient tab, etc.) may provide the stop that prevents the coupler portion 28 from moving off of the end 16 of the sheath 14.

Referring again to FIG. 2, the adapter 26 includes a threaded end 36 for coupling the adapter 26 to the docking device 20. A passageway 37 is provided through the end 36 and is sized so that the sheath 14 can move freely therethrough. In the embodiment shown, the threaded end 36 is received by an aperture 38 in the device 20 and secured by a nut 39. Once the adapter 26 is engaged with the docking device 20, the insulation 24 may be added to fill the recessed region 21.

Turning now to FIG. 3, the assembly 10 is shown from the side in a partial cross-section. As shown, the biasing member 30 is received in the receptacle region 32 of the adapter 26 and the distal end 11 of the sheath 12 extends beyond the bottom surface 22 of the docking device 20. In this example, the biasing member 30 is not compressed. In other embodiments, the biasing member 30 can be partially compressed or biased.

FIG. 4 shows the assembly 10 when engaged with a surface 40 of a structure, such the wall of a reactor vessel or the outer surface of a furnace tube in a petrochemical processing plant. In the embodiment of FIG. 4, the docking device 20 is made of a magnetic material so that the docking device 20 magnetically attaches the assembly 10 to the surface 40 of the structure. The assembly 10 can be easily disengaged from the surface 40 by overcoming the magnetic coupling. In other embodiments, the docking device can be removably attached to the surface 40, such as by a removable fastener or by welding.

When the bottom surface 22 of the docking device 20 comes into contact with the surface 40, the distal end 16 of the sheath 14 is moved back through passageways 37 and 29 and receptacle region 32 in a direction that compresses the biasing member 30. This compression results in a biasing force that urges the distal end 16 of the sheath 14 in a direction back towards the surface 40 of the structure so that contact of the distal end 16 with the surface 40 is maintained, thereby maintaining the thermocouple junction point 11 in close proximity with the surface 40.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A temperature sensing assembly for measuring temperature of a surface of a structure, comprising:
   a thermocouple device having a temperature sensing junction point disposed within an elongate sheath to measure the temperature of the surface of the structure;

a docking device having a bottom surface to attach to the surface of the structure and a passage for receiving the elongate sheath, wherein the bottom surface is formed by at least one fin; and a spring loaded adapter to couple the thermocouple device to the docking device, wherein the spring loaded adapter maintains a biasing force on the thermocouple device to maintain a distal end of the elongate sheath substantially in contact with the surface when the docking device is attached to the surface of the structure.

2. The assembly as recited in claim 1, wherein the docking device is made of a magnetized material.

3. The assembly as recited in claim 1, wherein the docking device includes a recessed portion that contains a thermally insulative material to insulate a portion of the elongate sheath that is proximate the temperature sensing junction point when the docking device is attached to the surface of the structure.

4. The assembly as recited in claim 1, wherein the spring loaded adapter includes a receptacle region to receive a biasing member, and wherein the biasing member exerts the biasing force on the thermocouple device when the docking device is attached to the surface of the structure.

5. The assembly as recited in claim 4, wherein the biasing member is a spring, and the spring is attached to the elongate sheath.

6. The assembly as recited in claim 5, wherein the spring is compressed when the docking device is attached to the surface of the structure.

7. A temperature sensing assembly for measuring temperature of a surface of a structure, comprising:
   a thermocouple device having a temperature sensing junction point positioned proximate a distal end of an elongate sheath to measure the temperature of the surface of the structure;
   a docking device having a bottom surface to magnetically couple to the surface of the structure and a passage for receiving the elongate sheath, wherein the bottom surface is formed by at least one fin; and
   an adapter to couple the thermocouple device to the docking device so that the distal end of the elongate sheath is maintained substantially in contact with the surface when the docking device is magnetically coupled to the surface of the structure.

8. The temperature sensing assembly as recited in claim 7, wherein the adapter includes a biasing member to urge the distal end of the elongate sheath in contact with the surface when the docking device is magnetically coupled to the surface.

9. The temperature sensing assembly as recited in claim 8, wherein the biasing member is a spring with helical coils.

10. The temperature sensing assembly as recited in claim 9, wherein the coils are disposed about the elongate sheath, and where at least one coil grips the outer surface of the elongate sheath.

11. The temperature sensing assembly as recited in claim 9, wherein the adapter includes a receptacle region and wherein the spring is contained within the receptacle region.

12. The temperature sensing assembly as recited in claim 7, further comprising a coupler device disposed about the elongate sheath to couple the thermocouple device to the adapter.

13. The temperature sensing assembly as recited in claim 7, wherein the distal end of the elongate sheath extends beyond the bottom surface of the docking device when the docking device is not magnetically coupled to the surface of the structure.

14. The assembly as recited in claim 7, wherein the docking device includes a recessed portion that contains a thermally insulative material to insulate at least a portion of the elongate sheath proximate the temperature sensing junction point when the docking device is magnetically coupled to the surface of the structure.

15. A method of monitoring temperature of a surface of a structure, comprising:
   attaching a thermocouple device to a docking device using a spring loaded adapter so that a distal end of the thermocouple device protrudes through a passage in the docking device and past a bottom surface of the docking device when the docking device is not attached to the surface of the structure, the bottom surface being formed by at least one fin; the thermocouple device having a temperature sensing point positioned proximate the distal end; and
   attaching the bottom surface of the docking device to the surface of the structure so that, when attached, the spring loaded adapter exerts a biasing force on the thermocouple device to maintain the distal end of the thermocouple device substantially in contact with the surface of the structure.

16. The method as recited in claim 15, wherein attaching the bottom surface of the docking device to the surface of the structure comprises magnetically coupling the docking device to the structure.

17. The method as recited in claim 15, wherein the spring loaded adapter comprises a receptacle region that contains a biasing member, and wherein attaching the bottom surface of the docking device to the surface of the structure comprises biasing the biasing member.

18. The method as recited in claim 17, wherein the biasing member is a spring with helical coils, and wherein biasing comprises compressing the spring.

* * * * *